B. W. ST. CLAIR.
REGULATION OF ELECTRICAL APPARATUS.
APPLICATION FILED FEB. 13, 1920.
1,408,040.
Patented Feb. 28, 1922.
2 SHEETS—SHEET 2.
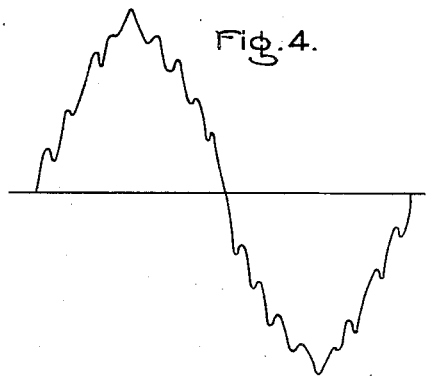
Fig. 4.
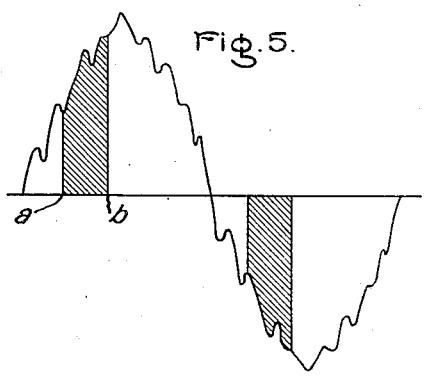
Fig. 5.
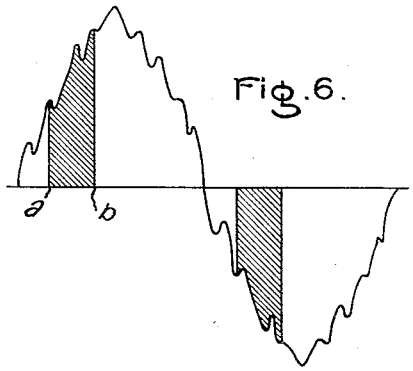
Fig. 6.
Fig. 7.
Fig. 8.
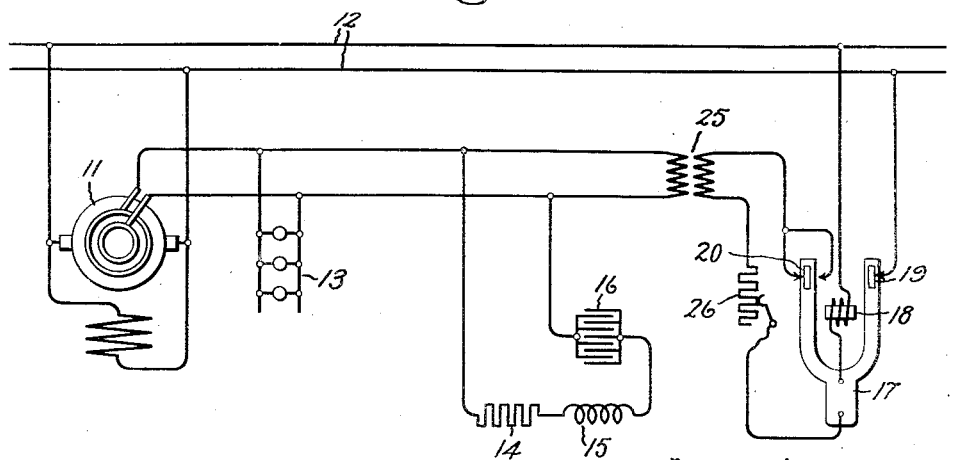
Inventor:
Byron W. St. Clair,
by Albert G. Davis
His Attorney.

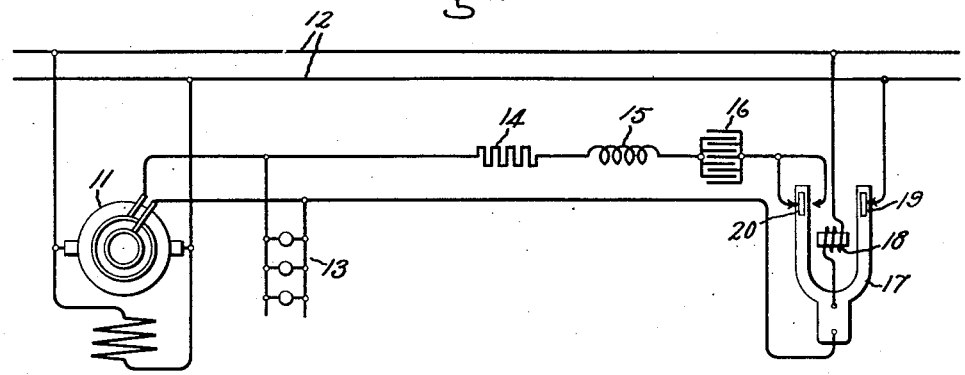
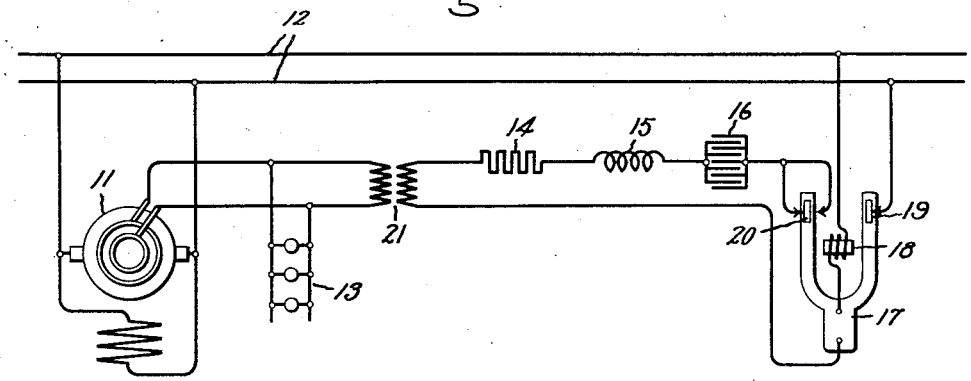
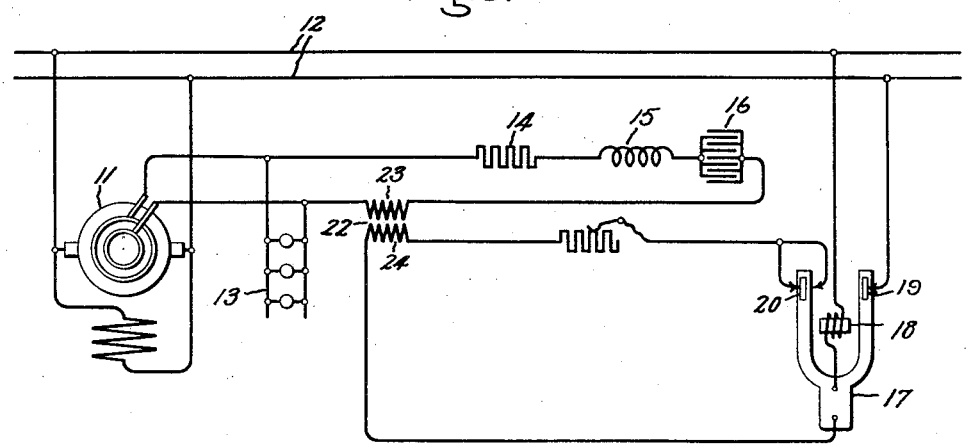

UNITED STATES PATENT OFFICE.

BYRON W. ST. CLAIR, OF LYNN, MASSACHUSETTS, ASSIGNOR TO GENERAL ELECTRIC COMPANY, A CORPORATION OF NEW YORK.

REGULATION OF ELECTRICAL APPARATUS.

1,408,040.　　　　Specification of Letters Patent.　Patented Feb. 28, 1922.

Application filed February 13, 1920. Serial No. 358,560.

*To all whom it may concern:*

Be it known that I, BYRON W. ST. CLAIR, a citizen of the United States, residing at Lynn, in the county of Essex, State of Massachusetts, have invented certain new and useful Improvements in the Regulation of Electrical Apparatus, of which the following is a specification.

My invention relates to the regulation of electrical apparatus, and more particularly to the speed control of motor generator sets, synchronous converters adapted to be driven from the direct current side, or motors.

In general, my invention comprises improvements upon the system described in the patent to E. F. Northrup, No. 843,415. In the system there described, a vibratory contact connects a damping load at intervals of one alternation to the machine, which load is supposed to increase as the speed of the machine increases. However, the tendency of the synchronous converter to hunt is not entirely obviated when the wave shape of the alternating current is distorted appreciably. For ordinary purposes such a device as shown in the patent mentioned is satisfactory; but it has been found, for example, that when it is necessary to use such a system for the measurement of a very small interval of time, even a relatively small amount of hunting may be very objectionable. Ordinarily such hunting is hard to eliminate because the speed of the machine is bound to be very high when utilized for such a purpose.

My improvements minimize speed variations so much as to render them inappreciable, even for such work, for example, as the application to a chronomicrometer, in which the machine is used to drive a timing disc or the like. With a chronomicrometer embodying my improvements it has been possible to measure accurately the intervals of time which elapse at space intervals of a few inches while a bullet is traveling in a rifle barrel.

Broadly considered, my invention contemplates the employment of resonant circuits disposed in such a relation to the vibratory contact-making device that a very large damping load, irrespective of the wave shape of the E. M. F., is placed upon the apparatus should the speed increase even very slightly; and on the other hand, the normal damping load is reduced very much when the speed is reduced. Another object is to enable a large damping load to be governed without undue sparking at the vibratory contacts. Various arrangements of the regulating circuits may be used in accordance with my invention, as fully described further on, and it is merely necessary to add at this point that the vibratory make and break device of substantially the same character as described in the patent to Northrup, is utilized.

The construction and mode of operation of my invention will be understood from the following description taken in connection with the drawings, in which Fig. 1 is a diagram of connections showing one embodiment of my invention; Fig. 2 is a modification thereof; Fig. 3 is a further modification; Figs. 4, 5 and 6 are diagrams showing the action of the ordinary tuning-fork control when operating in a system having a distorted wave shape; Fig. 7 is a diagram showing how the distortion may be minimized so that the control may be most effective; and Fig. 8 is a further modification of my device.

Referring now more in detail to the drawings in which like reference numerals refer to corresponding parts throughout, the dynamo-electric machine 11, here shown as a rotary converter, is adapted to be driven from the direct-current mains 12. The alternating current side of the machine may supply a useful load as indicated by the lamp circuit 13, although in the application to a chronomicrometer, the machine is used as a motor. As is well understood, the speed of the machine may be maintained constant by the use of a damping load adapted to be supplied from the A. C. side of the machine and connected periodically through a make and break device. The rate at which the contacts are made and broken by the vibratory device depends upon the desired frequency of the system. The action of the damping load is in general the same as in the Northrup patent; but its operation with a distorted wave of E. M. F. is slightly different, which difference is demonstrated in Figs. 4, 5 and 6. In these figures pronouncedly distorted wave form is shown, but this is quite common in machines of the small size ordinarily utilized for a timing function. When the tuning-fork makes contact at the point represented by *a* and later on breaks contact at the point represented by *b*, the amount of energy that is used up in the damping load may be represented proportionately by the shaded areas in Figs. 5 and 6. The phase in which this shaded area occurs is determined by the instantaneous speed of the machine. Thus, if the speed of the machine is greater than normal, the shaded area will occur more nearly at the apex of the wave of current; on the other hand, should the machine slow down, the shaded area occurs more nearly at the zero part of the curve. In this way, the damping load to serve its purpose should be increased when the speed increases and decreased when the speed decreases. Should the shape of the current wave be a sine-wave, or at least be free from sharp jags or peaks, the shift in phase of the shaded portion representing the damping load would automatically bring about the requirements stated above; but in actual practice the shaded area might not fulfill these requirements. With the jagged wave shown in Figs. 4, 5 and 6, the shaded area in Fig. 6 is greater than the shaded area in Fig. 5, even though the phase of the shaded area in Fig. 6 is nearer to the zero part of the curve. The resulting bad effect of this would be pronounced hunting of the machine. To obviate this difficulty, I have so designed the damping load circuit as to wipe out these jags in the wave shape and to cause the response of the quantity of energy to be more nearly that required.

A simple scheme of connection for obtaining this result I show diagrammatically in Fig. 1. In this figure I show the resistance 14, inductance 15 and capacitance 16 so arranged in the damping load circuit as to be resonant, or nearly so, to the fundamental frequency of the wave of alternating current, or in other words, resonant to a frequency at which it is desired to keep the alternating current. The make and break device in this instance is shown as a tuning fork 17 adapted to be kept in operation by any well-known means, such for example, as the electromagnet 18 and contacts 19 included in the circuit for said electromagnet. When the circuit including the contacts 20 and elements 14, 15, and 16 approach resonance with the desired frequency, the jags in the wave form of current may be eliminated and the device will operate without hunting. This is due to the fact that in a resonant circuit, the fundamental frequency current is accentuated. The effect of the resonant circuit is illustrated diagrammatically in Fig. 7 where the upper line is the wave shape of the current where the circuit is not resonant, and the lower line the wave shape of the current flowing in the damping load circuit of Fig. 1. It is to be noted that exact resonance in this circuit is not absolutely essential. Several cycles either below or above resonance may be had without preventing the wiping out of the large jags in the wave form. It is only necessary that when the shaded area representing the amount of energy supplied to the damping load occurs later on in phase, that it be increased by a relatively large amount. While the sine wave will accomplish this result, any other wave shape will also cause such a behavoir provided there are no pronounced peaks therein.

In Fig. 2 there is shown a modification of the above described circuit. In this case the electrical system supplied from the alternating current side of the machine which approaches resonance with the desired frequency is connected to said source through a transformer 21, instead of directly to the brushes of the machine. The other elements, such as the resistance 14, inductance 15, capacitance 16, and tuning fork 17, are connected similarly to that shown in Fig. 1. With this scheme of connections the tuning fork circuit may be designed so as to break a relatively small current. However, the system operates for all practical purposes like that described in Fig. 1.

Another objection to the ordinary system of control by tuning forks or by vibratory contacts is the fact that large amounts of energy cannot ordinarily be sparklessly controlled by these contacts. When the rate of energy consumption in a circuit is large, there is bound to be objectionable sparking at the contacts which open and close that circuit. Such a disadvantage is obviated by the arrangement that I have illustrated in Fig. 3. In this figure the circuit comprising the resistance 14, inductance 15, and capacitance 16 are joined in series and connected to the A. C. side of a dynamo-electric machine 11. This circuit is adapted to be made periodically resonant with the desired frequency of the system. When this occurs a large damping load flows through this circuit. The means for causing this circuit to be resonant to the specified frequency includes a vibratory make and break device, here shown as a tuning fork 17 similar in every way with the tuning forks shown in Figs. 1 and 2. This tuning fork controls by its action one of the electrical constants of the damping load circuit so as to cause said circuit to be resonant to the desired frequency, one for every cycle or plurality of cycles of the electric circuit. In this case the transformer 22, the primary coil 23 of which is connected in series with the other elements of the damping load circuit, cooperates with the fork 17 to produce the periodic variation. The secondary coil 24 of said transformer is connected in series with the contacts of the vibratory make and break device. It is evident that should the secondary coil 24 be short-circuited the inductance in the damping load circuit is reduced, while if the secondary coil 24 be open circuited the inductance is increased. This is merely one way in which the inductance of the damping load circuit may be varied periodically. For each alternation or a multiple thereof, the secondary coil 24 is short-circuited, and while this occurs the damping load circuit is so designed that it is resonant to the desired frequency. Only an inappreciable damping load flows while the circuit for the secondary coil 24 is open. However, when said circuit is closed a very heavy damping load is obtained. The advantage is that the rate of energy consumption in the secondary circuit of the transformer 22 is very small indeed, compared with that in the damping load circuit proper. In this way it is possible to control a damping load as much as fifty times the load in the secondary controlling circuit. A condition is thus obtained which obviates objectionable sparking of the contacts of the vibratory make and break device. The elimination of objectionable sparking at the contacts also helps to obviate objectionable hunting of the entire machine, since any tendency to draw an arc at the contacts results in a variable time of application of the damping load. This would, of course, give rise immediately to speed fluctuations. Other schemes than that shown may readily be thought of by a person skilled in the art, whereby constants other than the inductance of the damping load circuit may be periodically varied. It is also to be noted that the circuit here shown is just as adapted to smooth out distortions in the current wave shape as those illustrated in Figs. 1 and 2.

In Fig. 8 there is shown another scheme whereby the tendency to hunt of a rotary converter, carrying a high speed mechanical load is materially reduced. In this scheme the vibratory make and break device 17 controls the opening and closing of a secondary circuit of a transformer 25 which comprises a damping load circuit. A resistance 26 adapted to be varied for regulation purposes to be included in the secondary circuit. Connected in parallel with said transformer is a resonant circuit of quite sharp resonance, forming another damping load circuit. The resonant point may be from one-half to two cycles above the normal operating speed on the machine. A tendency for the machine to increase its speed is met by an increase in the load drawn from the machine. Conversely, a decrease of machine frequency is counterbalanced by a decrease in load, and as the change in load can be made very great for slight shifts in speed the damping action can be made almost anything desired.

While I have shown in the accompanying drawing several embodiments of my invention, I do not wish to be limited thereto, but desire to cover in the appended claims all modifications falling fairly within the scope of my invention.

What I claim as new and desire to secure by Letters Patent of the United States is:—

1. In combination, dynamo-electric machinery the speed of which is to be maintained constant, adapted to be driven from a source of direct current and to furnish alternating current, and an electric system supplied from the alternating current side of said machinery adapted to provide a damping load that is a function of the variation of the speed of the machinery from that desired, said system including a vibratory make and break device causing said load to be appreciably effective periodically at a rate proportional to the desired frequency of the system, and a circuit resonant to a frequency approaching the desired frequency of the system.

2. In combination, dynamo electric machinery the speed of which is to be maintained constant, adapted to be driven from a source of direct current and to furnish alternating current, an electric circuit supplied from the alternating current side of said machinery adapted to provide a damping load, a vibratory make and break device co-operating with said circuit, to permit the flow of an appreciable alternating current through said circuit periodically to serve as a damping load, said damping load being also a function of the variation of the speed of the machinery from that desired, said circuit, when the make and break device is effective to cause the flow of said appreciable alternating current, being resonant to a frequency approaching that desired.

3. In combination, dynamo electric machinery adapted to be driven from a source of direct current and to furnish alternating current, a damping load circuit supplied from the alternating current side of said dynamo-electric machine, a transformer, the primary of which is included in said circuit, a vibratory make and break device included in the secondary circuit, having a rate proportional to the desired frequency of the alternating current, the constants of said damping load circuit being so adjusted that a small change in the power consumed in the secondary circuit brought about periodically by the make and break device, causes a much greater change in the power consumed in the primary circuit.

4. In combination, a dynamo-electric machine adapted to be driven from a source of direct current and to furnish alternating current, a damping load circuit supplied from the alternating current side of said machine including a resistance, an inductance and a capacitance, a transformer the primary of which is also included in said circuit, a vibratory make and break device adapted periodically to short circuit the secondary of said transformer, the resistance, inductance, and capacitance of said circuit being so adjusted as to make the circuit resonant to the desired frequency when the secondary of the transformer is short-circuited.

5. In a system comprising dynamo-electric machinery adapted to be driven from a source of direct current and to supply alternating current, a damping load circuit supplied from the alternating current side of said machine, said circuit including inductance, reactance, and capacitance, the method of keeping the speed of said machinery constant, which consists in changing one of the above-mentioned constants of the circuit periodically at a rate proportional to the rate at which the dynamo-electric machine is to operate, so as to make the circuit periodically resonant to the desired frequency of the alternating current.

6. In a system comprising dynamo-electric machinery adapted to be driven from a source of direct current and to supply alternating current, a damping load circuit supplied from the alternating current side of said machine, said circuit including inductance, resistance and capacitance, and a transformer the primary of which is also included in said circuit, the method of keeping the speed of said machine constant which consists in varying the secondary circuit conditions of said transformer at a rate proportional to the desired frequency of the damping load circuit so as to make that circuit periodically resonant to the desired frequency.

7. In combination, dynamo-electric machinery the speed of which is to be maintained constant, adapted to be driven from a source of direct current and to furnish alternating current, and electric system supplied from the alternating current side of said machinery adapted to provide a damping load, a vibratory make and break device having contacts for opening and closing one of the circuits in the system at a rate proportional to the desired frequency, an inductance, a resistance, and a capacitance in said circuit arranged so as to make said circuit resonant to the desired frequency whereby the damping load is caused to have a relatively large variation in response to a relatively small variation in the speed of said machinery.

In witness whereof, I have hereunto set my hand this ninth day of February, 1920.

BYRON W. ST. CLAIR.